(12) United States Patent
Simon et al.

(10) Patent No.: US 6,269,206 B1
(45) Date of Patent: Jul. 31, 2001

(54) MICROSCOPE WITH A SHORT PULSE LASER WHICH IS COUPLED IN VIA A LIGHT-CONDUCTING FIBER

(75) Inventors: Ulrich Simon, Rothenstein; Ralf Wolleschensky, Schoeten, both of (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/238,858

(22) Filed: Jan. 28, 1999

(30) Foreign Application Priority Data

Jun. 18, 1998 (DE) .............................................. 198 27 139

(51) Int. Cl.$^7$ ...................................................... G02B 6/26
(52) U.S. Cl. .................................. 385/31; 385/43; 385/7; 385/88; 359/385
(58) Field of Search .................................. 385/31, 43, 39, 385/88, 7; 359/368, 385, 386, 388

(56) References Cited

U.S. PATENT DOCUMENTS

| | | | |
|---|---|---|---|
| 4,342,499 | * 8/1982 | Hicks, Jr. ................................ | 385/30 |
| 5,119,385 | * 6/1992 | Aoshima et al. ....................... | 372/23 |
| 5,852,702 | * 12/1998 | Nishida et al. ........................ | 385/130 |
| 5,862,287 | * 1/1999 | Stock et al. ............................ | 385/123 |
| 5,920,425 | * 7/1999 | Yoo et al. .............................. | 359/390 |
| 5,952,668 | * 9/1999 | Baer ...................................... | 250/492.2 |
| 5,995,281 | * 11/1999 | Simon et al. ........................... | 359/368 |
| 6,016,376 | * 7/1999 | Ghaemi et al. ........................ | 385/116 |

* cited by examiner

Primary Examiner—Rodney Bovernick
Assistant Examiner—Ellen E. Kim
(74) Attorney, Agent, or Firm—Reed Smith LLP

(57) ABSTRACT

A microscope with a short pulse laser which is coupled into the illumination beam path via light-conducting fiber, particularly with pulse lengths in the subpicosecond or picosecond range comprising an optical arrangement for wavelength-dependent temporal delay of the laser pulses being provided between the laser and light-conducting fiber. Further, structure for increasing the average output of the radiation coupled into the microscope by at least one dispersive element is arranged following an end of the light-conducting fiber in the illumination direction.

9 Claims, 5 Drawing Sheets

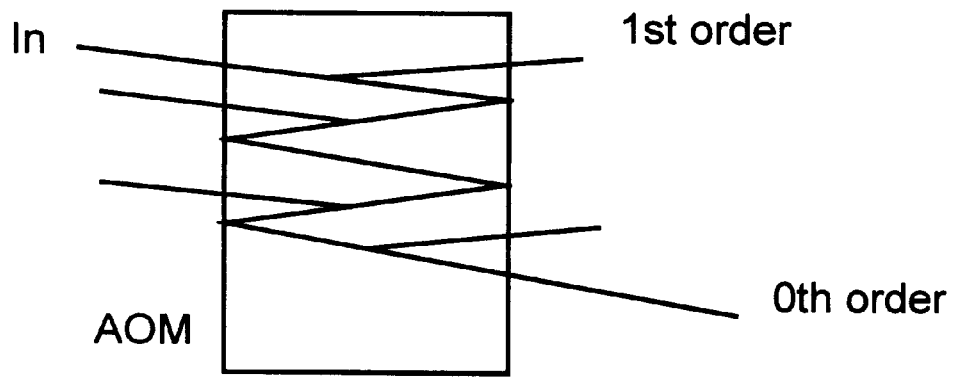
F I G. 7a
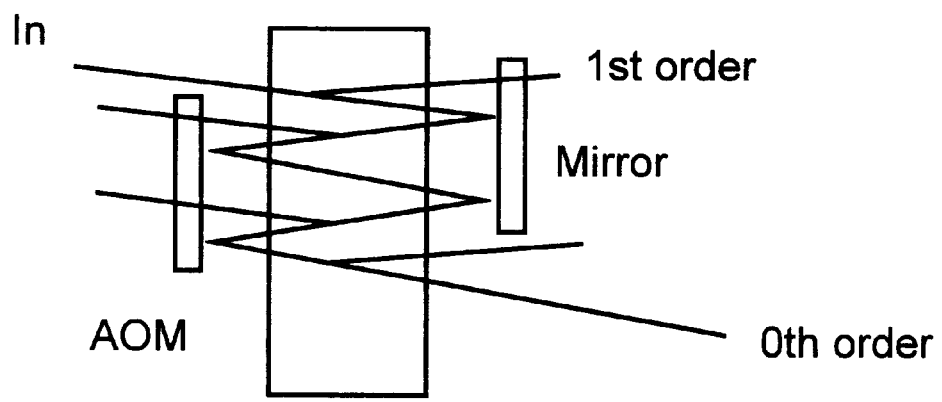
F I G. 7b

MICROSCOPE WITH A SHORT PULSE LASER WHICH IS COUPLED IN VIA A LIGHT-CONDUCTING FIBER

BACKGROUND OF THE INVENTION a) Field of the Invention

The invention relates to microscopes and, in particular, microscopes with a short pulse laser which is coupled in via a light-conducting fiber.

b) Description of the Related Art

Short pulses, depending on pulse length, have a determined spectral bandwidth. In dispersive media such as, e.g., the glass of an optical fiber, the pulse length changes when passing through the medium due to the influence of group velocity dispersion (GVD).

This occurs as a result of the temporal splitting of the individual frequency components of the pulses because in normal dispersive media (glass) the red-shifted frequency components have a higher group velocity than the blue-shifted frequency components. The spectrum remains unaffected by this.

This pulse widening can be compensated by means of a suitable pre-chirping unit (e.g., comprising gratings or prisms or a combination thereof) as in DE-GM 29609850.

For this purpose, the spectral components of the pulses are arranged with respect to time in the pre-chirping unit in such a way that the blue-shifted frequency components run in advance of the red-shifted frequency components in comparison with the center frequency. When subsequently coupled into a dispersive medium (e.g., an optical glass fiber), this temporal splitting of the pulse frequency components is eliminated again. The pulses accordingly appear at the end of the optical medium (glass fiber) in their original form, i.e., in the form in which they came out of the laser.

In addition to these linear effects, however, nonlinear effects, i.e., effects depending on the intensity of the laser radiation, also occur in optical media. These effects (SPM, XPM, etc.) have an effect on the spectral width or pulse profile.

In most cases, they limit the minimum pulse length that can be achieved in a pre-chirping unit. These effects are undesirable for coupling of a short pulse laser.

These effects can be prevented in principle by limiting the intensity of the laser radiation below a critical value ($I_{crit}$). In a short pulse laser, the intensity (I) is determined by the pulse length (T), repetition rate (f), average output ($P_{avg}$) and by the beam cross section (A) by the following equation:

$$I = \frac{P_{Avg}}{\tau \cdot f \cdot A} < I_{crit}$$

In mode-conserving and polarization-conserving glass fibers, the cross-sectional surface is determined by the wavelength of the laser radiation to be coupled and the repetition rate is determined by the laser system that is used.

The change in pulse length of a pulse sent through a pre-chirping unit beforehand when passing through the glass fiber is shown in the upper part of FIG. 2. It will be seen that the pulse length at the end of the fiber is minimal. Accordingly, the intensity increases toward the end of the fiber when the average output remains constant.

At the same time, there is also an increase in the influence of the nonlinear effects (SPM) at the end of the fiber. This is shown in the lower part of FIG. 2 by the change in the spectral width.

Accordingly, at a given pulse length at the output of the glass fiber, the average output that can be coupled into the microscope is limited by the nonlinear effects.

OBJECT AND SUMMARY OF THE INVENTION

It is the primary object of the invention to minimize the influence of nonlinear effects on the pulse profile. This object is met by a microscope with a short pulse laser which is coupled into the illumination beam path via light-conducting fiber, particularly with pulse lengths in the subpicosecond or picosecond range comprising an optical arrangement for wavelength-dependent temporal delay of the laser pulses being provided between the laser and light-conducting fiber. Further, means for increasing the average output of the radiation coupled into the microscope by at least one dispersive element is arranged following an end of the light-conducting fiber in the illumination direction.

In order to prevent nonlinear effects at the end of the fiber, the intensity is reduced according to the invention. This can be carried out in an advantageous manner, for example, by enlarging the cross-sectional surface A (see equation above). This enlargement must be carried out at that point at which the pulse length, and accordingly the intensity, reaches the critical value. The pulse is accordingly further compressed in a region with greater cross-sectional surface so that nonlinear effects can be prevented. The following applies in this case, the greater the dispersion in the region with large cross section, the greater the average output that can be coupled.

A fiber whose core diameter increases at the end of the fiber is shown in FIG. 4. Instead of a fiber with increasing cross section, two or more fibers which can also advantageously be connected one into the other can also be used, wherein the cross section of the individual fibers increases in the direction of illumination.

However, it is particularly advantageous when a highly dispersive element is installed in the laser scanning microscope. A highly dispersive element of this kind is, for example, any type of prism or grating compressor. Further, special glass materials or crystals (e.g., TeO2) such as those installed, e.g., in acousto-optic devices, are suitable.

FIG. 1 shows an arrangement using an acousto-optic modulator (AOM).

By using these AO devices (AOM; AOD (acousto-optic device); AOTF (acousto-optic tunable filter)), the nonlinear effects can be prevented (i.e., the average output that can be coupled at a given pulse length) and all of their advantages in laser scanning microscopy can be made use of at the same time.

For example:
scanning of the laser beam
continuous attenuation
rapid switching in ms range
and delay of the phase.

Especially when used as an AOM, this crystal can also be traversed repeatedly to increase the dispersion. This is carried out in a particularly simple manner by using the zeroth order and by reflecting out the 1 st order in a corresponding manner.

The invention and its advantages will be explained more fully hereinafter with reference to the schematic drawings.

Figure 8:
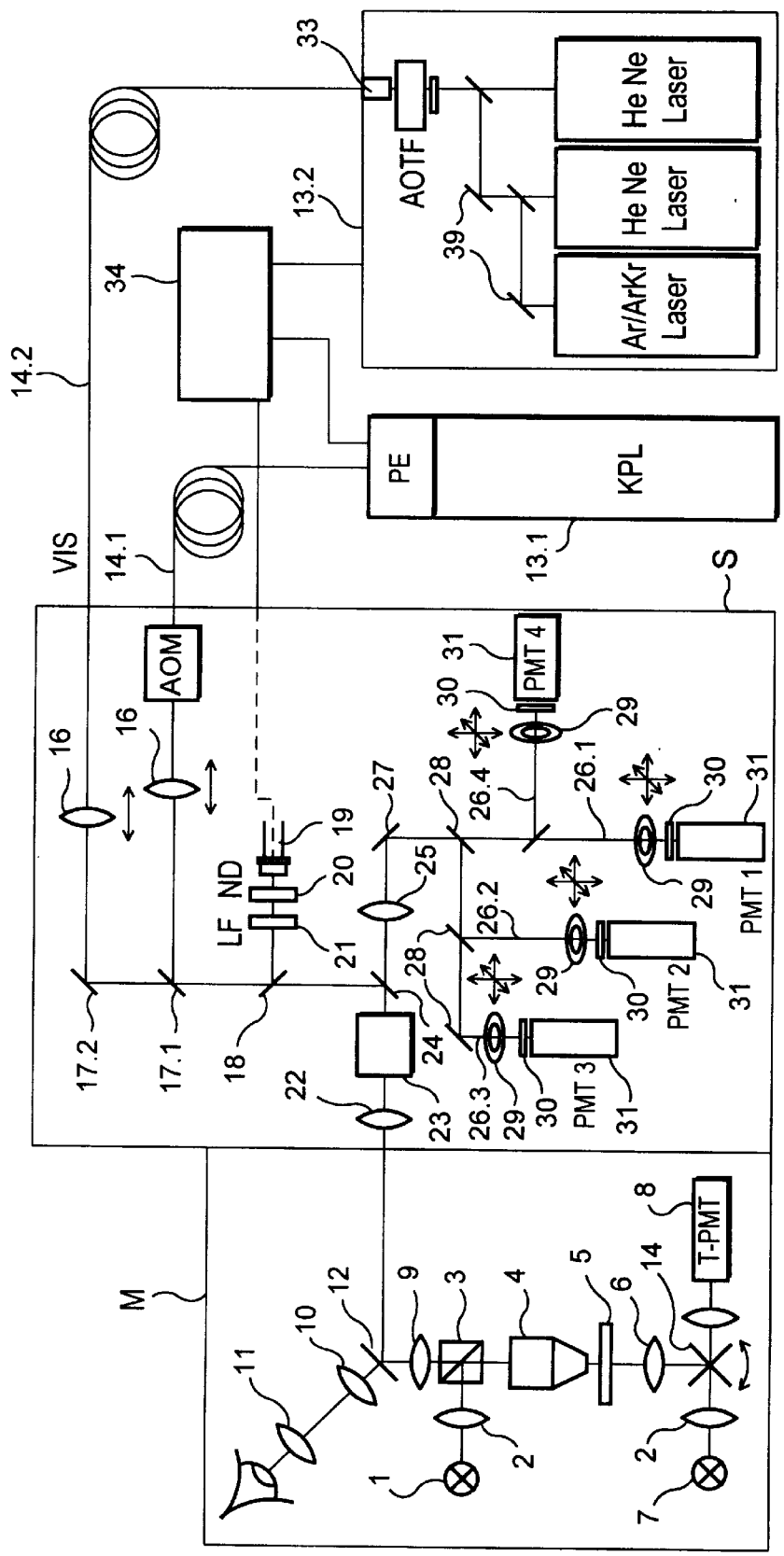

The microscope is advantageously a laser scanning microscope (LSM) as is shown in FIG. 8.

Figure 1:
FIG. 1 is a schematic diagram showing the coupling of a short pulse laser KPL into a microscope via a pre-chirping unit PE and a light-conducting fiber.
Figure 2A:
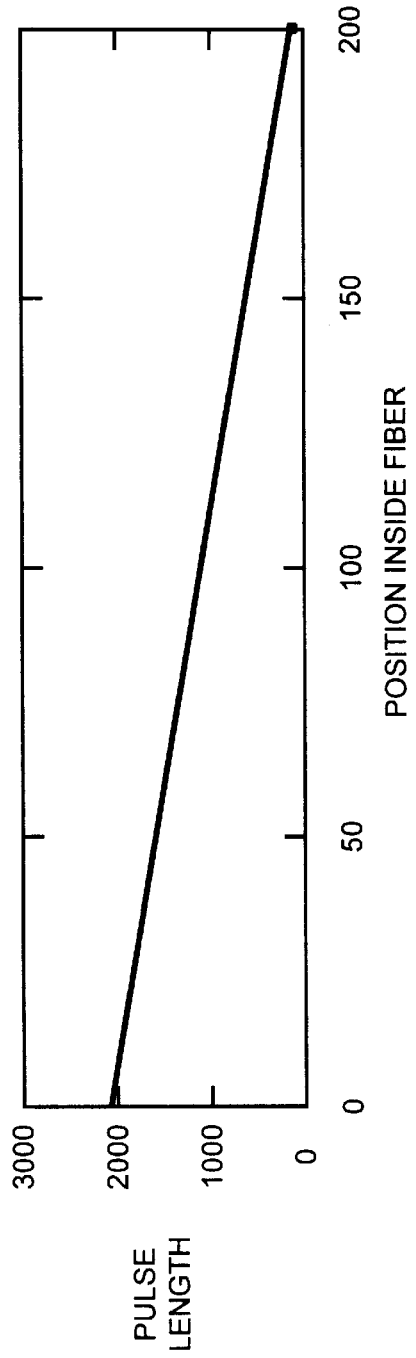

FIG. 2a shows the shape of the pulse length and of the spectral width along the length of the fiber.

Figure 2B:
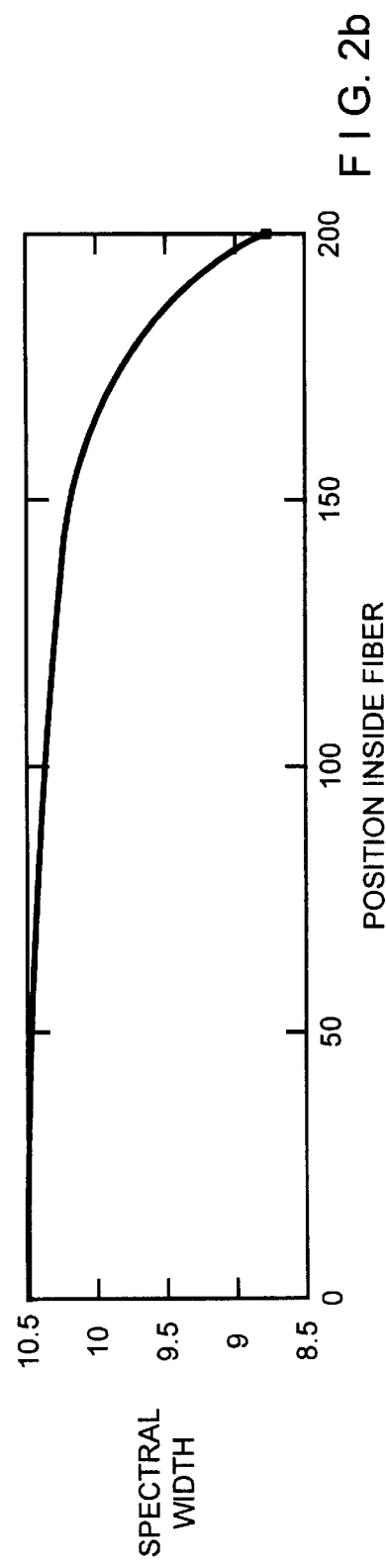

FIG. 2b shows the minimum possible pulse length as a function of the average output.

Figure 3:
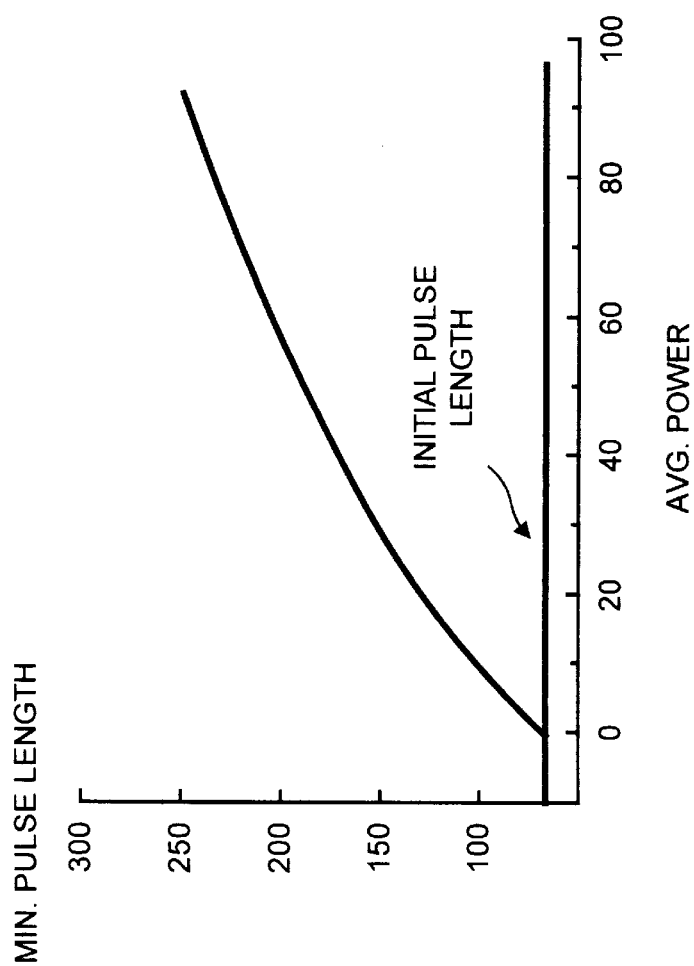

FIG. 3 shows the minimum pulse length as a function of the average power.

Figure 4:
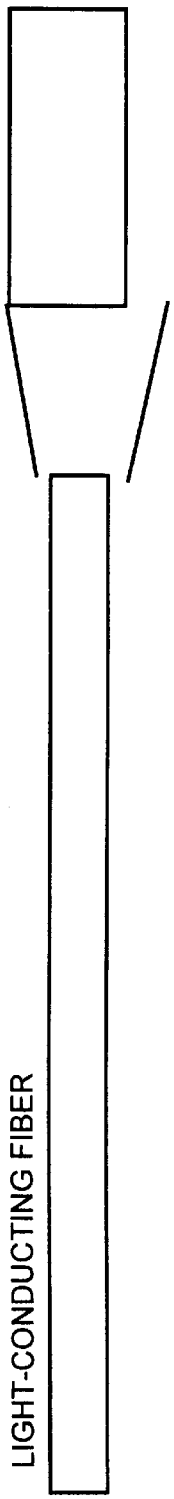

FIG. 4 shows a light-conducting fiber with a cross section which increases toward the end in the direction of illumination.

Figure 5:
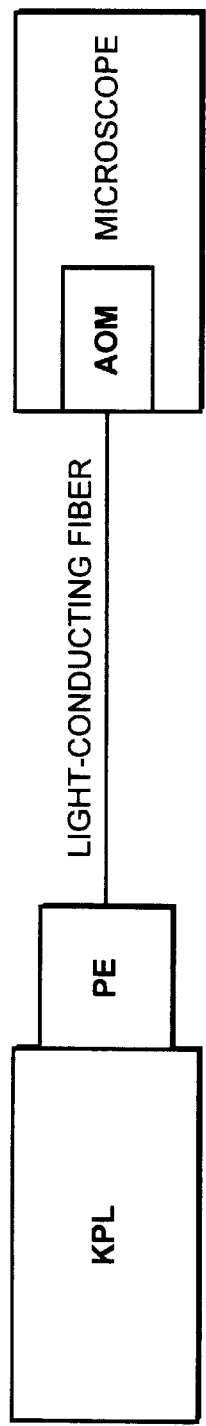

FIG. 5 shows the arrangement of an acousto-optic modulator AOM at the end of the fiber in the microscope.

Figure 6:
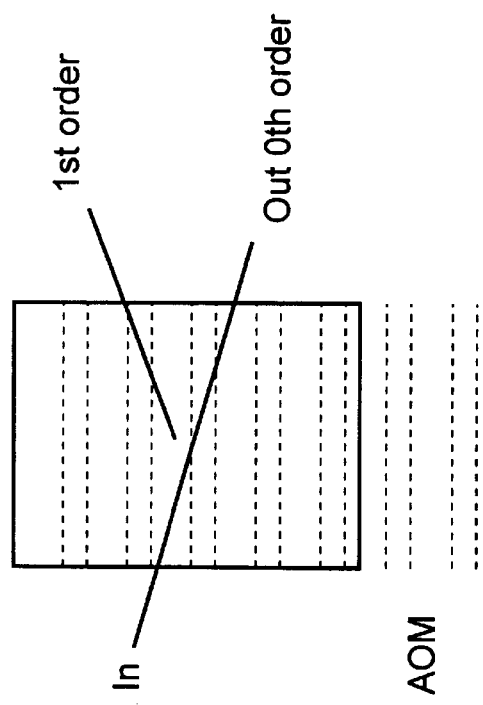

FIG. 6 shows the beam entering the AOM through the end of the fiber (not shown here) and diffracted exiting beams of the 0th and first order.

The AOM is advantageously operated in the 0th order, as shown in FIG. 7a, and the first order is mirrored out of the beam path (not shown).

In order to increase dispersion and average output, it is desirable that the 0th order passes repeatedly through the AOM. This can also be carried out, for example, by arranging an additional mirror for multiple reflection of the 0th order behind the AOM, as is shown in FIG. 7b.

FIG. 8 shows schematically a microscope unit M and a scan head S which has a common optical interface via an intermediate imaging and form a LSM.

DESCRIPTION OF THE PREFERRED EMBODIMENTS

The scan head S can be arranged at the phototube of an upright microscope and also at a side output of an inverse microscope.

The drawing shows a microscope beam path which is switchable between incident light scanning and transmifted-light scanning by means of a swivelable mirror 14 and comprising light source 1, illumination optics 2, beam splitter 3, objective 4, specimen 6, condenser 6, light source 7, receiver arrangement 8, a first tube lens 9, an observation beam path with a second tube lens 10 and eyepiece 11, and a beam splitter 12 for coupling in the scanning beam.

A laser module 13.1, 13.2 receives the laser and is connected with the laser input-coupling unit of the scan head S via monomode light-conducting fibers 14.1, 14.2.

Coupling into the light-conducting fibers 14.1, 14.2 is carried out by means of displaceable collimating optics 16 which will be discussed more fully hereinafter, and beam deflecting elements 17.1, 17.2.

A monitoring beam path is stopped down by means of a partially transmitting mirror 18 in the direction of a monitor diode 19, in front of which line filters 21 and neutral filters 20 are advantageously arranged on a rotatable filter wheel, not shown.

The actual scanning unit comprises a scanning objective 22, scanner 23, main beam splitter 24 and shared imaging optics 25 for detection channels 26.1–26.4.

A deflecting prism 27 behind the imaging optics 25 reflects the radiation coming from the object 5 in the direction of dichroic beam splitters 28 in the convergent beam path of the imaging optics 25 which are followed by pinholes 29 which can be adjusted in the direction of and vertical to the optical axis and varied in diameter, an individual pinhole 29 being provided for each detection channel, and by emission filters 30 and suitable receiver elements 31 (PMT).

The radiation of a short pulse laser KPL is coupled into glass fibers 14.1, preferably a single-mode glass fiber.

As is shown in DE-29609850, a pre-chirping unit PE is arranged between the laser and the light-conducting fiber.

As was already described, an acousto-optic modulator AOM is provided at the input of the scan module.

The input-coupling optics 33 for coupling in the laser radiation have lens systems, not shown, for the purpose of coupling in, wherein the focal length of the lens systems is determined by the beam cross section of the lasers and the numerical aperture required for optimal coupling in.

Single-wavelength and multiple-wavelength lasers which are coupled into one or more fibers individually or jointly via an AOTF are provided in the laser module 13.2.

It is also possible to mix the radiation of different lasers at the fiber input and this mixing can be carried out by the exchangeable and switchable splitter mirror 39 which is shown schematically.

The laser radiation exiting in a divergent manner from the end of the fiber 14.1,2 at the scanning unit s in FIGS. 2 and 3 is collimated to an infinite beam by the collimating optics 16. This is advantageously carried out by an individual lens which, by displacing it along the optical axis by means of a control unit 37 which is controllable by a central driving unit 34, has a focusing function in that its distance from the end of the light-conducting fiber 14.1,2 at the scanning unit can be changed according to the invention. Various chromatic compensations can be adjusted independently by means of a plurality of input-coupling fibers and collimating optics for different wavelengths.

The monitor diode 19 which can also have a preset focusing lens, not shown in the drawing, acts in conjunction with a line-selective or region-selective filter wheel or filter slide 21 controlled by a control unit 36 for continuous monitoring of the laser radiation coupled into the scan module, especially in order to monitor the output in a determined laser line in isolation and, if need be, to stabilize it via the AOTF 32 by means of a regulating signal of the driving unit 34.

The scanner 23 itself can advantageously be constructed as an AOM or AOD, wherein two AOMs or AODs, respectively, can cooperate for both scanning directions. In this case, the scanner simultaneously serves as the dispersive element according to the invention, and the combination of two elements serves as a substitute for repeatedly passing through an AOM as is shown in FIG. 7b.

While the foregoing description and drawings represent the preferred embodiments of the present invention, it will be obvious to those skilled in the art that various changes and modifications may be made therein without departing from the true spirit and scope of the present invention.

What is claimed is:

1. A microscope with a short pulse laser which is coupled into the illumination beam path via a light-conducting fiber, particularly with pulse lengths in one of the subpicosecond range and picosecond range, comprising:
   an optical arrangement for wavelength-dependent temporal delay of the laser pulses being provided between the laser and light-conducting fiber; and
   means for increasing the average output of the radiation coupled into the microscope by at least one dispersive element which is arranged following an end of the light-conducting fiber in the illumination direction.

2. The microscope according to claim 1, including at least one of prisms and gratings following the end of the light-conducting fiber in the illumination direction.

3. The microscope according to claim 1, having at least one acousto-optic modulator, arranged subsequent to the end of the light-conducting fiber.

4. The microscope according to claim 3, wherein said at least one acousto-optic modulator is at least one of an AOM, AOD and AOTF.

5. The microscope according to claim 1, wherein the dispersive element is arranged in the microscope housing at the coupling-in location of the light-conducting fiber.

6. The microscope according to claim 1, with means for raster detection of an object.

7. The laser scanning microscope according to claim 1, including at least one acousto-optic modulator as scanner in at least one scanning direction.

8. The microscope according to claim 1, including at least one light-conducting fiber for coupling in, wherein the cross section of the light-conducting fiber increases in the direction of illumination toward the microscope.

9. The microscope according to claim 8, including a plurality of interconnectable fibers, wherein the fiber cross section increases in the direction of illumination toward the microscope.

* * * * *